United States Patent Office 3,535,038
Patented Oct. 20, 1970

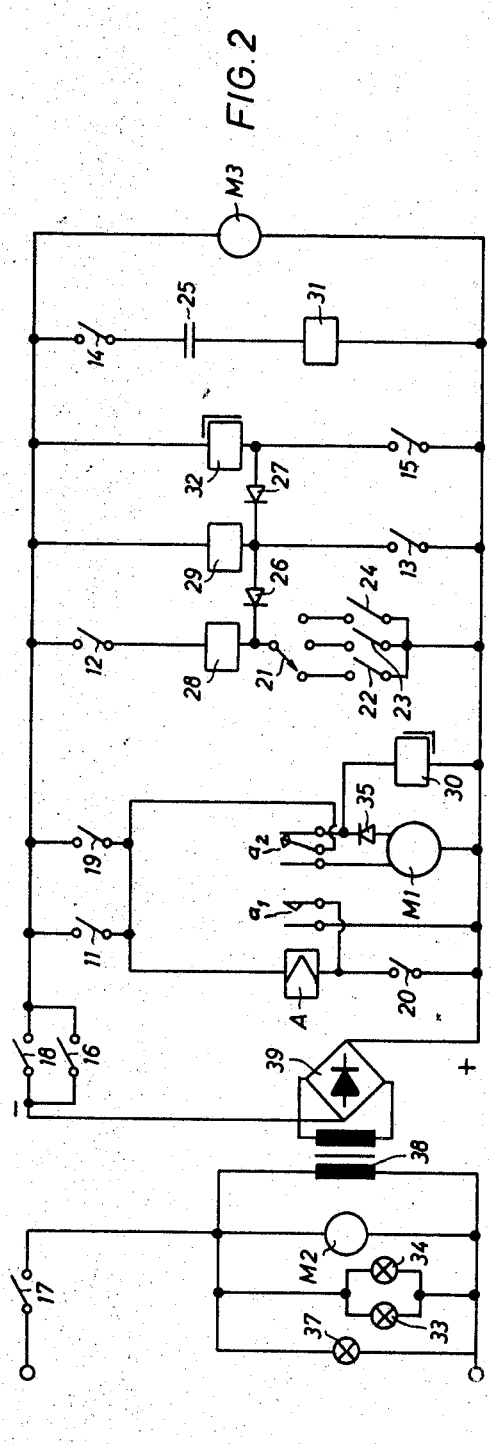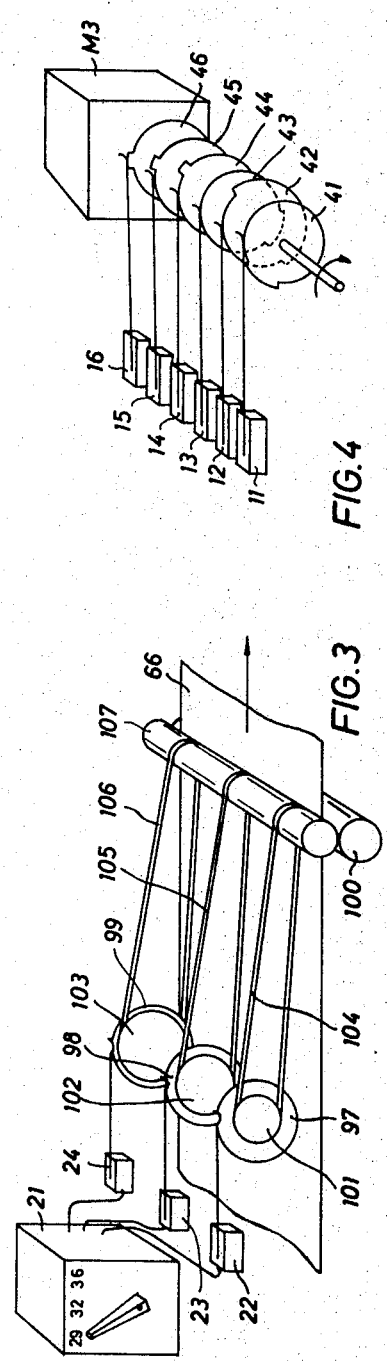

3,535,038
APPARATUS FOR EXPOSING LIGHT-SENSITIVE COPYING MATERIAL
Emile Frans Stievenart, Antwerp, and Hugo Frans Deconinck, Deurne-Zuid, Belgium, assignors to Givaert-Agfa N.V., Mortsel, Belgium, a Belgian company
Filed June 10, 1968, Ser. No. 735,741
Claims priority, application Great Britain, June 8, 1967, 26,580/67
Int. Cl. G03b 27/70
U.S. Cl. 355—66        11 Claims

ABSTRACT OF THE DISCLOSURE

Document reproducing apparatus for exposing a light sensitive copying material to a document original. A sheet of copying material is fed to a support or copying plane which is parallel to the object plane or support for holding the original document. The original document is scanned and an image thereof is transmitted to the copying material by a carriage movable in a direction parallel to the object and copying planes. The carriage includes an elongate light source for illuminating the original and further includes a system of rejective surfaces with a lens interposed therebetween for projecting an image portion of the original to a corresponding portion of the copy material.

---

Figure 1:
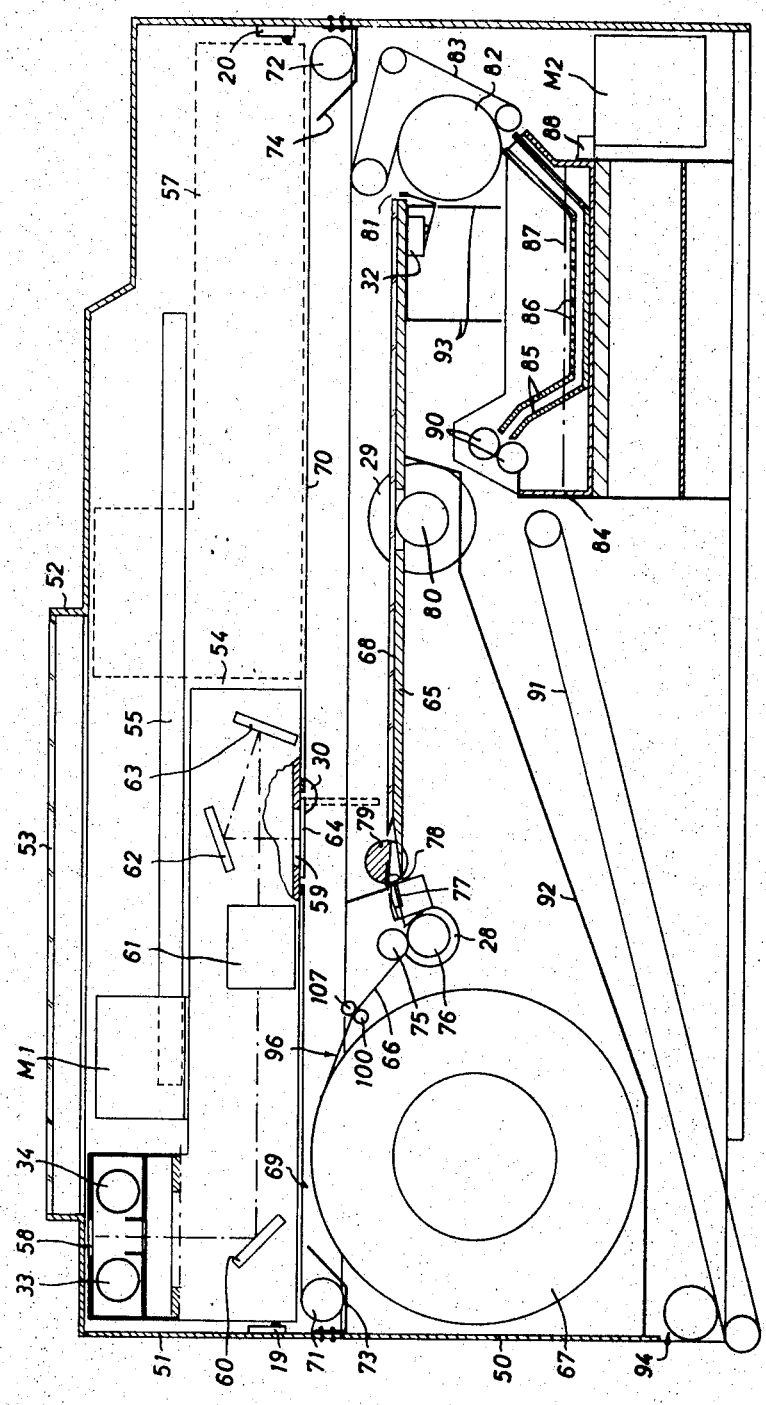

The present invention relates to an apparatus for exposing light-sensitive copying material and is particularly intended for use in compact document reproduction apparatus wherein the copying material is episcopically exposed to an original.

Apparatus of the mentioned kind comprise means defining an object plane for the location therein of the original to be reproduced, means defining a copying plane for the location of the copying material, a lens system for the projection of the image of the original onto the copying material and a light source for the illumination of the original.

Since the dimensions of such apparatus are relatively great when the image of the original must be integrally projected onto the copying material in one time, it has been proposed to scan the original by making the optical system and the light source travel along the original and by reflecting the image of the original over several mirrors onto a travelling copying material. In such apparatus wherein the projection of the image occurs by scanning, relatively complicate driving means are required for ensuring the proper advance of the copying material and of the optical projection system.

The object of the present invention is to provide a compact and reliable apparatus for exposing a stationary light-sensitive copying material by projection to a stationary original with a travelling scanner.

According to the present invention an apparatus for exposing light-sensitive copying material to an original comprises a stationary board for supporting the original with the image located in an object plane, means defining a copying plane substantially parallel to the object plane and adapted to hold copying material stationary during exposure, feed means for feeding a sheet of copying material from a supply of such material into the copying plane, a carriage movable in one operative direction between the object and the copying plane and parallel thereto, said carriage including an elongate light source for projecting a narrow beam or beams of light onto the original, first reflecting means disposed at an inclination to the direction of travel of the carriage to reflect the image portion reflected from the original in a direction substantially parallel to the said direction of travel to second reflecting means, further reflecting means for reflecting the image from said second reflecting means onto the copying plane, and a focussing lens positioned at the optical center of the optical system, the longitudinal axis of said elongate light source and all the said reflecting means extending substantially transversally to the path of travel of the carriage, a light shield interposed in the optical path between said object plane and said copying plane, and a slot aperture in said light shield extending transversely to the path of movement of said carriage, and being arranged for transmitting only the reflected beam of the image portion reflected from the original.

The invention will hereinafter be described with reference to an apparatus for exposing and developing a photographic light-sensitive composite sheet material for the production of an image according to the silver complex diffusion transfer process, which material comprises in order a non-transparent flexible support sheet, a light-sensitive silver halide emulsion layer, and a layer containing a white or coloured pigment and a hydrophilic colloid binder.

However, the invention is not limited to apparatus for treating material of this particular composition and other applications of the apparatus according to the invention will be mentioned in the description.

In the drawings:
FIG. 1 is a diagrammatic longitudinal view of the apparatus according to the invention.
FIG. 2 is the electric circuit of the apparatus.
FIG. 3 is the mechanism controlling the size of the sheet of copying material drawn from a roll.
FIG. 4 is the camshaft mechanism controlling the operation cycles of the apparatus.

The apparatus is mounted in a light-tight housing 50 to which light-tightly fits an upper part 51. The upper part 51 is provided with a rectangular frame 52 wherein a transparent board 53 is fitted, the upper surface of which constitutes the object plane of the optical system of the apparatus.

A carriage 54 is mounted for horizontal movement on laterally spaced racks 55 which are fitted on the longitudinal side walls of part 51. The upper part of one rack is toothed so that a motor unit $M_1$ which is fitted to the carriage may drive, through engagement of a pinion with the toothed rack, the carriage from the inoperative position, shown in the figure, to the right, to reach a position 57 as shown in dash lines. Thereafter the same motor unit returns the carriage to its initial position.

The carriage extends transversely of the apparatus between the two longitudinal side-walls thereof, whereas the transverse cross-section of the carriage is L-shaped, the longer leg running horizontally.

The carriage may be a metal box, the inside and outside of which is dull black painted and light-tightly closed except for slot apertures 58 and 59 through which the projection beam from the original can enter and respectively leave the carriage.

Inside of the carriage are mounted, their longitudinal axis extending transversely of the apparatus, two tubes-like lamps 33, 34, a first miror 60, a focussing lens 61, a second mirror 62 and a third mirror 63.

The position of the focussing lens 61 in the optical path is such that the distance from the object plane to the lens is equal to the distance from the copying plane, measured along the optical axis.

The aperture 59 is provided with a shutter 64 which is spring-biased to keep the aperture closed in the inoperative position. The shutter is opened upon excitation of a solenoid 30 to reach a position as shown in dash lines.

The copying plane is defined by a horizontal non-transparent support plate 65 for supporting a sheet of copying material 66 drawn from a roll 67 of such material. The sheet of material (not shown in the figure) is kept flat on the support plate 65 by means of a glass plate 68 under which it is slid. The glass plate 68 rests free on plate 65 and is prevented from sideward displacement by several studs (not shown) disposed around said plate and fitted into the support plate 65.

Ambient light is prevented from impinging directly on the sheet of copying material through the transparent plate 53 by means of a light shield consisting of two opaque curtains 69 and 70 rolled on rotatable cores 71 and 72, which are journalled near the lower extremities of the removable upper part 51 of the apparatus. The cores 69 and 70 are spring-biased to tend to roll up the curtains fitted thereto. The free edges of the curtains are fitted to the carriage near the opposite longitudinal sides of the slot aperture 59. Two stationary light shields 73 and 74, also fitted to the upper part of the apparatus, complete the light shield formed by the curtains.

The roll 67 is actually a cylindrical cassette provided with a longitudinal slit through which the copying material may be light-tightly drawn from the core on which a roll of such material is wound.

The supply of the light-sensitive copying material in the described way permits the loading of the apparatus in daylight. After removal of the upper part 51 with the curtains 67 and 70, the seating of the roll 67 is directly accessible.

The feed means for feeding a sheet from the roll of copying material to the copying plate comprises a first driven roller pair 75, 76 which may be intermittently driven through a magnetic clutch 28, a cutter comprising a stationary knife 77 and a co-operating so-called rotating knife 78 mounted in a rod 79 which upon excitation of a solenoid 32 (not shown in this figure) may effect a brief rotation through some angular degrees in anti-clockwise direction. The rod 79 has an elongate wedge-like opening through which the material is passed to enter through a widened opening between the plates 65 and 68.

A second feed roller 80, which may be intermittently driven through a magnetic slip clutch 29, projects with its resilient covering through an opening in the support plate 65 to slightly contact the backside of the copying material lying thereon without lifting, however, the glass plate 68.

At the end of the plates 65 and 68 a spring-biased stop finger 81 is provided which upon excitation of a solenoid 32 is lifted to intercept the path of a sheet tending to leave the gap between the two plates 65 and 68.

After the exposure, the sheet is advanced and enters between the roller 82 and laterally spaced conveyor belts 83, which rotate at a peripheral speed substantially equal to that of feed rollers 75 and 76.

The sheet is guided into the processing unit which comprises a tank 84 with guide plates 85 provided with a plurality of small openings 86 through which the processing liquid may circulate. The processing liquid takes in the operative position of the apparatus the level indicated by dash and dot line 87. The processing composition is contained in a conventional way in a plastic bag located under the processing tank, and connected with the inlet 88 of the tank through a flexible conduct. By raising a plate by means of a lever (said mechanism and the bag are not shown) the bag is compressed and the content flows into the tank 84. By lowering the lever, the processing liquid flows from the tank back into the bag.

The sheet is squeezed through pressure roller pair 90 and received on laterally spaced conveyor belts 91 which transport the sheet out of the apparatus.

In the lower part of the apparatus two light shields 92 and 93 are provided which trap the ambient light which can enter the apparatus through the exit opening 94.

In said lower part of the apparatus is also located a motor $M_2$ which through timing belts or the like drives the conveyor belts 91, pressure rollers 90, roller 82, the magnetic slip-clutch 29 of roller 80 and the magnetic clutch 28 of rollers 75, 76. Further said part contains a motor $M_3$ driving a camshaft which controls the operation cycle of the apparatus, and a transformer and rectifier for providing the D.C. supply for the electric circuit. Finally, the apparatus is provided with a control panel comprising a main switch 17, a start switch 18, a switch 21 for selecting the length of the copying sheet, and a pilot lamp 37.

The electric components just described are not shown in FIG. 1, but they are taken up in the electric circuit of FIG. 2 which will be discussed hereinafter in the description of one operation cycle of the apparatus.

In said electric circuit the contacts of the microswitches have been given the same numerals as the microswitches themselves.

Before starting copying, the apparatus is loaded with a roll of copying material of the type as described in the introduction of the description. In such copying material the image-wise exposure of the light-sensitive layer may occur through the layer containing the white pigment. After processing, a diffusion transfer image is produced in or on the pigment layer. On observing the transfer image thus produced, the negative image in the silver halide emulsion layer is screened from the eye by the pigment layer.

The processing composition contains the necessary ingredients for carrying out the diffusion transfer process, i.e. the developing compounds, the complexing agents for the unexposed silver halide and the alkaline substances. However, as known, it is especially interesting to incorporate the developing agents at least partly but preferably wholly into the composite material, whereby the processing liquid may be reduced to a mere alkaline composition which can be used for quite a long time.

Further details about the composition of the mentioned kind of copying material and of processing composition may be found, e.g., in our co-pending Great Britain patent application 26,580/67 filed June 8, 1967.

A sheet of copying material being located on the support plate 65, with the leading edge located against the stop finger 81 raised in its operative position, and an original e.g. a letter or a page of an opened book, being positioned on the board 53 with the image turned downwardly, the operator closes main switch 17 (FIG. 2) and actuates the start push button switch 18 which is normally opened.

Through switch 17 the electric A.C.-circuit of motor $M_2$, of exposure lamps 33, 34, of pilot lamp 37 and of transformer 38 is closed. The lamps 33, 34 actually are fluorescent tubes, the electric circuit of which comprises a starter and a choke (not shown).

Through switch 16 the D.C. circuit of motor $M_3$ is closed so that said motor starts to rotate the camshaft (FIG. 4) carrying cams 41 to 46, controlling microswitches 11 to 16 respectively. In the present case the operation cycle for producing one copy, corresponding with one revolution of the camshaft, amounted to 12 seconds.

Almost immediately after motor $M_3$ started to rotate, the cam 46 permits the lever of microswitch 16 to lower so that the electric contact of said switch is closed. Motor $M_3$ keeps rotating until one revolution has been performed and cam 46 lifts again the lever of microswitch 16.

After about half a second cam 41 lifts the lever of microswitch 11, so that the normally opened contact 11 thereof now closes over contact $a_2$ of relay A the electric circuit of the shutter solenoid 30 and over diode 35 the circuit of the carriage motor $M_1$.

The shutter 64 is opened and the carriage 54 starts to travel to the right.

Immediately after its first movement, the carriage no longer actuates the lever of microswitch 19 so that the contact thereof, which was kept open, now closes. In this way, the opening again of the contact of microswitch 11 during the continued rotation of the cam 41 does not interrupt the mentioned circuit.

About three seconds after it started moving the carriage reaches the end position 57 wherein the carriage actuates the lever of microswitch 20 so that the contact of said switch is closed. Thereby the relay A is energized, contact $a_1$ is closed and contact $a_2$ is switched over.

The switched over contact $a_2$ closes the other circuit of the motor $M_1$, so that said motor starts to rotate in the opposite sense, thereby returning the carriage to the initial inoperative position. Diode 35 prevents further excitation of the solenoid 30 so that the shutter 64 is closed.

Upon the returning of the carriage, the contact of switch 20 opens again, but the circuit of relay A remains closed through hold contact $a_1$. When the carriage is arrived in its initial position, microswitch 19 is opened and the carriage comes to arrest.

Shortly after the carriage started its returning movement, the cams 42 and 43 actuated the microswitches 12 and 13.

The closing contact of microswitch 13 closes the circuit of the magnetic slip clutch 29, whereas the contact of microswitch 12 closes the circuit of the magnetic clutch 28 over the diode 26 and closed contact 13.

The exposed sheet is advanced by roller 80 to enter between the roller 82 and conveyor belts 83.

The copying material is drawn from the roll 67 by rollers 75, 76 and is progressively advanced between the plates 65 and 68 until a defined length has been pulled.

The control of said length occurs by means of a mechanism, located at the position indicated by the arrow 96 in FIG. 1, and represented in detail in FIG. 3.

The mechanism comprises three cams 97, 98 and 99 of circular form and provided with a small notch at the periphery. The cams are free rotatable about a common shaft, and each of them is provided with a magnetic clutch 101, 102 and 103, respectively, to which a pulley is fitted.

Through belts 104, 105 and 106 the pulleys of the magnetic clutches may be driven by a roller 107, which is rotated through frictional contact with the sheet pulled by the feed rollers 75 and 76 over free rotating backing roller 100. The pulleys of the magnetic clutches have differing diameters so that the sheet of material 66 has to advance over differing lengths according to the cam which has to perform one revolution.

The cams 97, 98 and 99 are controlling the microswitches 22, 23 and 24 respectively. The contacts of the microswitches are opened when their levers rest in the notches of the cams as shown.

By means of selector switch 21 the desired length of copying material is selected, in the present case a length of 29 cm. Corresponding microswitch 22 is connected in the circuit of the magnetic clutch 28 and the magnetic clutch 101 of the corresponding cam 97 is energized. The energizing of the magnetic clutch 101 is not shown in the drawing but may occur, e.g. through a second three-position selector switch which rotates together with the selector switch 21, and between the three contacts of which and the +D.C. lead the magnetic clutches 101, 102 and 103, respectively, are connected. The common contact of the switch is connected over a normally open contact, controlled by a relay which is in parallel with the solenoid 28, to the —D.C. lead.

Turning back to the feed operation of a sheet initiated by the energizing of the clutches 28 and 29, the rotation of roller 107 by the sheet pulled from the roll 67 makes the cam 97 rotate and thereby closes the contact 22.

After about one second cam 43 lets the microswitch 13 open again so that the slip clutch 29 is de-energized. However, the magnetic clutch 28 is not de-energized since in the meantime the contact 22 has been closed. The rollers 75, 76 continue to pull the sheet from the roll, and the leading portion of the sheet freely passes over the now freely rotating roller 80 until the cam 97 has performed one revolution. At that moment the lever of the microswitch snaps in the notch of the cam, contact 22 is opened, and the magnetic clutch 28 controlling the feed rollers 75, 76 and the magnetic clutch 101 controlling the cam 97, are deenergized.

A few seconds thereafter cam 42 does no longer actuate microswitch 12, which does not make any difference in the interrupted circuit of clutch 28, and thereafter the microswitches 14 and 15 are operated in succession by cams 44 and 45.

The closing of contact 14 energizes briefly the solenoid 31 of the rotatable knife 78 through capacitor 25, so that the sheet is severed from the roll.

The closing of contact 15 shortly thereafter energizes the solenoid 32, moving thereby the finger 81 in the path the sheet intends to follow. Over diode 27 said closed contact also energizes the magnetic slip clutch 29 a second time. Roller 80 starts to rotate again and advances the severed sheet until it abuts with its leading edge against the finger 81 intercepting its path. Shortly thereafter contact 15 is opened so that the slip driving of roller 80 comes to arrest and the de-energized solenoid 32 permits the finger 81 to move out of the path of the sheet with a delay of some milliseconds over the arresting of the driving of roller 80.

The position of the sheet of copying material is accurately defined and when the cam 46 opens the microswitch 16 again, the apparatus comes to rest and is ready for a next exposure.

Meanwhile the exposed sheet has been transported through the processing unit and the excess of processing solution was squeezed away by the roller pair 90. The sheet is received on the conveyor belts 91 and when it leaves the apparatus through exit 94 the produced copy is or almost so.

In case the apparatus must be capable of automatically delivering a predetermined number of copies, the apparatus may comprise a countermechanism, known in itself, which counts down from a pre-set number of wanted copies and briefly closes the circuit of microswitch 16 after each copying cyclus until the required number of copies has been produced.

In a known way, the apparatus may also be provided with a sensitivity control for adjusting the density of the copies produced. This control may be in the form of an iris diaphragm in the focussing lens 61 or in the form of a shield with adjustable inclination in the optical path in the carriage 54. The knob or lever controlling said diaphragm or shield may be mounted on the carriage so that it is only accessible to the operator through an opening in the top of the housing during the inoperative position of the apparatus. In this way the change of a given setting during the exposure is prevented.

The apparatus according to the invention is not limited to the described embodiment.

The carriage may be arranged for performing an exposure in either direction in order to reduce the copying time, and thus may have an inoperative position at the left and at the right in the drawing according to FIG. 1.

Decelerating means may be provided for bringing the carriage quickly to arrest at the end of its course. Said means may comprise an electromagnetic brake on the motor $M_1$, but successful decelerations have also been obtained in discharging a capacitor through the reverse winding of the motor at the interruption of the driving circuit of the motor.

The mirror 60, 62 and 63 may be replaced by other reflecting means having the desired light-reflecting characteristics, e.g. prisms.

The application of the processing composition to the copying material may occur by other known techniques, e.g., by lick-roller coatings, kiss-coating, etc.

The processing composition may occasionally be heated.

The copy produced may be heated after excess of processing liquid has been squeezed away, to accelerate or to complete the drying thereof. Said drying arrangement may comprise I.R. rod heaters located at either side transversally of the path followed by the sheet below the shield 92, or a blower directing hot air onto the sheet. Occasionally, said heating means may be designed as a separate unit which may receive a sheet as it leaves the exit 94.

The light shield formed by curtains 69 and 70 may in a modified arrangement extend over rather than under the carriage 54, the ends of the curtains being in that case fitted near the longitudinal edges of the aperture 58, and the top of the apparatus being arranged for the location in the upper corners of the cores 71 and 72.

The application of the exposure apparatus according to the invention is not limited to the type of copying material described, but extends to other light-sensitive materials such as electrostatic or electrophotographic copying materials as well. An apparatus wherein the latter types of copying materials are used may comprise additional stations for the proper treatment of the material, e.g. in the case of zinc oxide copying material a corona device for electrostatically charging the material prior to its image-wise exposure, and means controlling the level, the composition (toner content) and the temperature of the processing composition.

The sheet which has been exposed according to the present invention may also constitute an intermediate step in the reproduction of an original. For instance it may be a negative from which a positive is to be printed, or it may constitute a master for printing therewith a plurality of copies.

When the exposed copy must have a laterally reversed image, the exposure of the copying material may occur through the support by advancing the copying material through plates 65 and 68 with the backside facing upwardly. The fluorescent tubes which constitute in the present embodiment the light sources 33 and 34 may be replaced by other types of actinic light sources, e.g. a plurality of conventional incandescent low tension bulbs, or quartz-iodine lamps.

In the embodiment described hereinbefore, the mechanism for feeding a sheet of copying material into the copying plane was designed such that a sheet was ready for exposure after a copy has been made in order to obtain a relatively short copying time for one copy. As a consequence thereof, the next copy must necessarily have the same size, unless the setting of the selector switch 21 is changed during the operation cycle, immediately after the exposure has taken place.

In case this manipulation is undesired, the electric circuitry may be modified to bring a copy sheet in the copying plane at the beginning of a copying cycle rather than at the end thereof with the consequence however, that the copying time for producing one copy is lengthened. The mentioned modification according to which the copying material is advanced through the copying plane at the beginning of a copying cycle is almost a necessity in case the copying material must undergo a treatment prior to the exposure such as the corona charging as mentioned hereinbefore.

Further, the arrangement for adjusting the length of the sheet of copying material may be devised for operating continuously, rather than discontinuously such as the mechanism described hereinbefore, so that the size of the copying material may be made to correspond almost, at least as to the length, with that of the original to be copied. A change in the width of the copying material may be obtained in a known way by arranging the apparatus so that it can receive rolls 67 of different width. Finally, the means for holding the sheet of copying material stationary in the copying plane during the exposure may comprise additional control means for slightly separating plates 65 and 68 from each other, or for reducing the pressure therebetween, during the transport of the sheet of copying material, and for firmly pressing said plates together during the exposure of the sheet. Alternatively, the sheet of copying material may be firmly held stationary by means of a vacuum frame. known as such.

We claim:

1. Apparatus for exposing light-sensitive copying material to an original comprising a stationary board for supporting the original with the image located in an object plane, means defining a copying plane substantially parallel to the object plane and adapted to hold copying material stationary during exposure, feed means for feeding a sheet of copying material from a supply of such material into the copying plane, a carriage movable in one operative direction between the object and the copying plane and parallel thereto, said carriage including an elongate light source for projecting a narrow beam of light onto the original, first reflecting means disposed at an inclination to the direction of travel of the carriage to reflect the image portion reflected from the original, in a direction substantially parallel to the said direction of travel to second reflecting means, further reflecting means for reflecting the image from said second reflecting means onto the copying plane and a focusing lens positioned at the optical center of the optical system, the longitudinal axis of said elongate light source and all the said reflecting means extending substantially transversely to the path of travel of the carriage, a light shield interposed in the optical path between said object plane and said copying plane, and a slot aperture in said light shield extending transversely to the path of movement of said carriage, and arranged for transmitting only the reflected beam of the image portion reflected from the original.

2. Apparatus according to claim 1, wherein said focusing lens is located between the first and second reflecting means.

3. Apparatus according to claim 1, wherein the focal distance from the object plane to the focusing lens is substantially equal to the focal distance from the copying plane to said focusing lens.

4. Apparatus according to claim 1, wherein each said reflecting means is in the form of a mirror.

5. Apparatus according to claim 1, wherein said light-shield comprises two light-tight curtains rolled on spring-biased rotatable cores mounted out of the path described by the projection beam, the free edges of the curtains being fitted near the opposite longitudinal sides of the slot aperture.

6. Apparatus according to claim 1, wherein a shutter is provided for interrupting the projection beam from the original to the copying material after the exposure has been terminated.

7. Apparatus according to claim 1, wherein the feed means comprises first feed means for drawing a given length of the copying material from a supply roll of such material, a cutter for severing the sheet from the roller, and a second feed means for advancing the sheet after its severance from the roll.

8. Apparatus according to claim 7, wherein the copying plane is defined by a horizontal support plate on which the sheet of copying material may rest with its backside, and a vertically displaceable transparent pressure plate which urges the sheet of copying material firmly against the support plate as it becomes located thereon.

9. Apparatus according to claim 8, wherein said second feed means comprises at least one roller driven over a slip clutch which projects through said support plate and which may frictionally engage the backside of the sheet of copying material.

10. Apparatus according to claim 8, wherein the position of the sheet of copying material in the copying plane is defined by the abutment of the leading edge of the sheet against a displaceable stop member which in the operative position intercepts the path of the sheet.

11. Apparatus according to claim 10, wherein the length of the sheets of copying material drawn from a roll of such material is controlled by a cam, the rotation of which depends on the advance of the sheet, and one complete revolution of which corresponds with the length of a sheet of copying material.

References Cited

UNITED STATES PATENTS

| | | | |
|---|---|---|---|
| 2,725,800 | 12/1955 | Dew Hurst | 355—66 |
| 3,245,330 | 4/1966 | Okishima | 355—13 |
| 3,260,154 | 7/1966 | Tchejeyam et al. | 355—66 |
| 3,323,412 | 6/1967 | Tchejeyam | 355—66 |
| 3,431,053 | 3/1969 | Wick et al. | 355—66 |

NORTON ANSHER, Primary Examiner

D. J. CLEMENT, Assistant Examiner

U.S. Cl. X.R.

355—27, 28, 29